United States Patent
Marugame (10) Patent No.: US 8,787,636 B2
(45) Date of Patent: Jul. 22, 2014

(54) DIAGNOSTIC IMAGING SUPPORT IN WHICH IMAGE DATA OF HIGH MAGNIFICATION IS GENERATED TO IMAGE DATA OF LOW MAGNIFICATION FOR CLASSIFICATION THEREOF

(75) Inventor: Atsushi Marugame, Tokyo (JP)

(73) Assignee: NEC Corporation, Tokyo (JP)

( * ) Notice: Subject to any disclaimer, the term of this patent is extended or adjusted under 35 U.S.C. 154(b) by 184 days.

(21) Appl. No.: 13/148,902

(22) PCT Filed: Dec. 25, 2009

(86) PCT No.: PCT/JP2009/007297
§ 371 (c)(1),
(2), (4) Date: Aug. 10, 2011

(87) PCT Pub. No.: WO2010/100704
PCT Pub. Date: Sep. 10, 2010

(65) Prior Publication Data
US 2012/0004514 A1    Jan. 5, 2012

(30) Foreign Application Priority Data

Mar. 4, 2009  (JP) ................................. 2009-050489

(51) Int. Cl.
*G06K 9/00*    (2006.01)

(52) U.S. Cl.
USPC ....................................................... 382/128

(58) Field of Classification Search
USPC .......................... 382/128–134; 128/920–925; 356/39–49; 600/407–414, 424–426; 345/581–618
See application file for complete search history.

(56) References Cited

U.S. PATENT DOCUMENTS

| 6,215,892 | B1 | 4/2001 | Douglass |
| 2002/0102011 | A1 | 8/2002 | Bacus et al. |
| 2006/0127880 | A1* | 6/2006 | Harris et al. ...................... 435/4 |
| 2009/0190812 | A1 | 7/2009 | Sano et al. |

FOREIGN PATENT DOCUMENTS

| CN | 1327502 A | 12/2001 |
| CN | 1383522 A | 12/2002 |
| CN | 1839391 A | 9/2006 |
| CN | 101304683 A | 11/2008 |
| CN | 101370008 A | 2/2009 |
| JP | 2-45734 A | 2/1990 |
| JP | 6-281553 A | 10/1994 |

(Continued)

OTHER PUBLICATIONS

International Search Report for PCT/JP2009/007297 mailed Feb. 2, 2010.

(Continued)

*Primary Examiner* — Atiba O Fitzpatrick
(74) *Attorney, Agent, or Firm* — Sughrue Mion, PLLC (57) ABSTRACT

A diagnostic imaging support device includes an image data acquisition unit that acquires image data of high magnification of sample tissue, an image classifying unit that generates image data of low magnification from the image data of high magnification acquired by the image data acquisition unit, and classifies the generated image data of low magnification into group by each image data pattern of a plurality of pathological tissue, and an image evaluating unit that evaluates whether or not the image data of high magnification, which is to be a base of the image data of low magnification classified by the image classifying unit, is the pathological tissue of the classified group.

15 Claims, 6 Drawing Sheets

(56) References Cited

FOREIGN PATENT DOCUMENTS

| | | |
|---|---|---|
| JP | 10-185911 A | 7/1998 |
| JP | 2000501184 A | 2/2000 |
| JP | 2001174456 A | 6/2001 |
| JP | 2002-514319 A | 5/2002 |
| JP | 2004505233 A | 2/2004 |
| JP | 2004-528532 A | 9/2004 |
| JP | 2005530138 A | 10/2005 |
| JP | 2006153742 A | 6/2006 |
| JP | 2006-292999 A | 10/2006 |
| JP | 2008139795 A | 6/2008 |
| JP | 2008185337 A | 8/2008 |
| JP | 2009-37250 A | 2/2009 |
| JP | 2009042462 A | 2/2009 |
| JP | 2011-174456 A | 9/2011 |
| WO | 9720198 A2 | 6/1997 |
| WO | 0250759 A1 | 6/2002 |

OTHER PUBLICATIONS

Japanese Office Action for JP2009-050489 mailed on Apr. 2, 2013.
The extended European search report for EP09841070 dated Jun. 8, 2012.
Chinese Office Action for CN Application No. 200980157829.X issued on Jul. 10, 2013 with English Translation.

* cited by examiner

DIAGNOSTIC IMAGING SUPPORT IN WHICH IMAGE DATA OF HIGH MAGNIFICATION IS GENERATED TO IMAGE DATA OF LOW MAGNIFICATION FOR CLASSIFICATION THEREOF

TECHNICAL FIELD

The present invention relates to a diagnostic imaging support device, a diagnostic imaging support method, and a storage medium which performs pathological evaluation, and particularly to a diagnostic imaging support device, a diagnostic imaging support method, and a storage medium that enable highly accurate pathological evaluation by easy processes.

BACKGROUND ART

A device that acquires an image of sample tissue on a microscope slide, and perform pathological diagnostic according to the acquired image (for example, see PTL 1). Further, in the device, pathological diagnostic by coarse to fine (coarse to fine) is performed, in which primary analysis is conducted using a low magnification image, and further analysis is performed with a high magnification image on a part that should be especially observed in the low magnification image.

CITATION LIST

Patent Literature

PTL 1: Published Japanese Translation of PCT International Publication for Patent Application No. 2000-501184

SUMMARY OF INVENTION

Technical Problem

However, in the device indicated in PTL 1, for example, after acquiring the low magnification image, it is required to adjust a focus and an aperture of the microscope, and acquire the high magnification image, thus the processes are likely to be inefficient. The present invention is made in order to solve such problem, and a main purpose is to provide a diagnostic imaging support device, a diagnostic imaging support method, and a storage medium that can perform efficient and highly accurate pathological evaluation.

Solution to Problem

An exemplary aspect of the present invention in order to achieve the above purpose is a diagnostic imaging support device that includes image data acquisition means that acquires image data of high magnification of sample tissue, image classifying means that generate's image data of low magnification from the image data of high magnification acquired by the image data acquisition means, and classifies the generated image data of low magnification into group by each image data pattern of a plurality of pathological tissue, and image evaluating means that evaluates whether or not the image data of high magnification, which is a base of the image data of low magnification classified by the image classifying means, is the pathological tissue of the classified group.

Further, another exemplary aspect of the present invention in order to achieve the above purpose may be a diagnostic imaging support method that includes acquiring image data of high magnification of sample tissue, generating image data of low magnification from the acquired image data of high magnification, and classifying the generated image data of low magnification into group by each image data pattern of a plurality of sample tissue, and evaluating whether or not the image data of high magnification, which is to be a base of the classified image data of low magnification, is pathological tissue of the classified group.

Furthermore, another exemplary aspect of the present invention in order to achieve the above purpose may be a storage medium storing a program causing a computer to execute a process that acquires image data of high magnification of sample tissue, a process that generates image data of low Magnification from the acquired image data of high magnification, and classifies the generated image data of low magnification into group by each image data pattern of a plurality of pathological tissue, and a process that evaluates whether or not the image data of high magnification, which is to be a base of the classified image data of low magnification, is pathological tissue of the classified group.

Advantageous Effects of Invention

According to the present invention, it is possible to provide a diagnostic imaging support device, a diagnostic imaging support method, and a storage medium that can perform efficient and highly accurate pathological evaluation.

DESCRIPTION OF EMBODIMENTS

Figure 1:
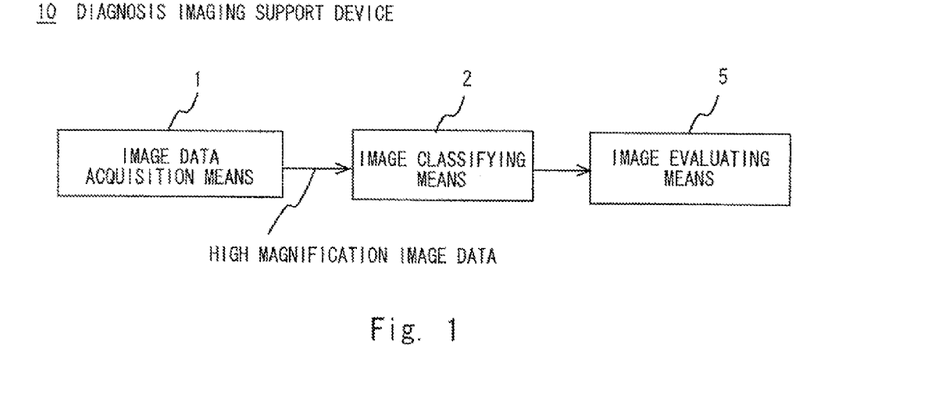
FIG. 1 is a functional block diagram of a diagnostic imaging support device according to an exemplary embodiment of the present invention; 1

Hereinafter, an exemplary embodiment of the present invention is described with reference to the drawings. FIG. 1 is a functional block diagram of the diagnostic imaging support device according to the exemplary embodiment of the present invention. A diagnostic imaging support device 10 according to this exemplary embodiment includes an image data acquisition means 1 that acquires high magnification image data of sample tissue, and an image classifying means 2 that generates low magnification image data from the high magnification image data acquired by the image data acquisition means 1, and classifies the generated low magnification image data into groups by image data pattern of a plurality of pathological tissue. Then, it is possible to classify the low magnification image data into groups by the image data pattern of the plurality of pathological tissue efficiently and at a high speed, and perform refinement.

Further, the diagnostic imaging support device 10 is provided with an image evaluating means 5 that evaluates whether or not the high magnification image data, which is to be a base of the low magnification image data classified by the image classifying means 2, is pathological tissue of the classified group. Accordingly, it is possible to evaluate with high accuracy whether or not the high magnification image data classified and refined by the image classifying means 2 is pathological tissue of the classified group. Therefore, efficient and highly accurate pathological evaluation can be performed.

Figure 2:
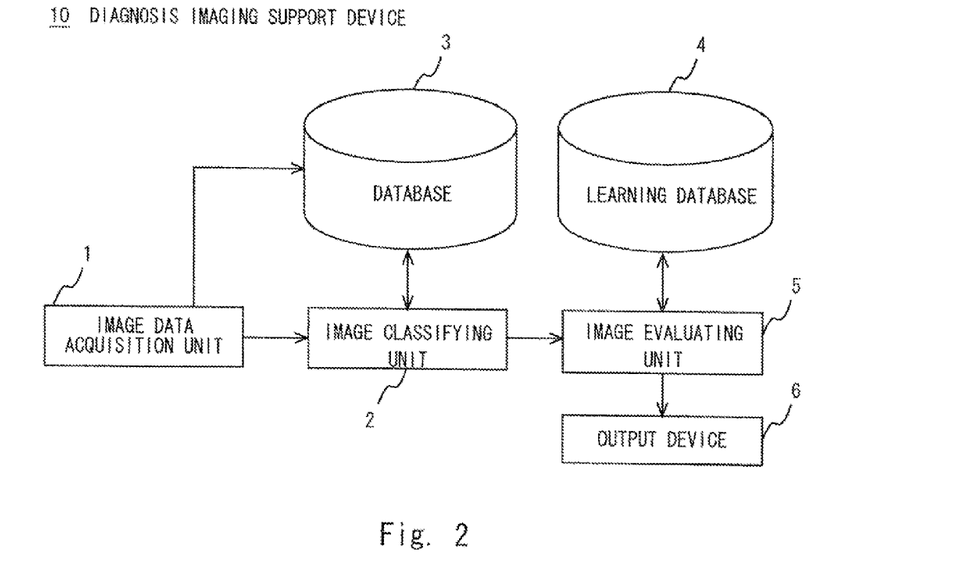
FIG. 2 is a block diagram showing a schematic system configuration of the diagnostic imaging support device according to the exemplary embodiment of the present invention.

FIG. 2 is a block diagram showing a summarized schematic system configuration of the diagnostic imaging support device according to the exemplary embodiment of the present invention. The diagnostic imaging support device 10 according to this exemplary embodiment is provided with an image data acquisition unit 1, an image classifying unit 2, a database 3, a learning database 4, an image evaluating unit 5, and an output device 6.

An image scanner device or the like that can acquire, for example, the high magnification image data of the sample tissue (hereinafter referred to as high magnification image data) is used for the image data acquisition unit (image data acquisition means) 1. The image scanner device 1 takes, for example, a stained mammary gland pathological slide, and generates image data of the entire sample tissue of high magnification. The image data acquisition unit 1 outputs the generated high magnification image data to the image classifying unit 2 and the database 3.

The database 3 stores image data pattern information for classifying the image data of low magnification of sample tissue described later into groups by each image data pattern of the plurality of pathological tissue. This image data pattern information includes numerical information such as parameters, score functions, and probability functions or the like in order to perform the classification of the groups. Further, the database 3 stores the high magnification image data output from the image data acquisition unit 1. Note that an arbitrary storage device such as a memory device, a magnetic disk unit, an optical disk device or the like can be used for the database 3 and the learning database 4. Moreover, although the database 3 and the learning database 4 are configured as different storage devices, it is not limited to this and they may be configured as a single storage device.

Further, although the image data pattern of the plurality of pathological tissue is classified into a normal, a benign tumor, a precancerous state, a cancer state or the like, it is not limited to this, but an arbitrary classifying method can be adopted. For example, the image data pattern of the plurality of pathological tissue can be classified into groups of four mammary gland pathology image data patterns, which is composed of (a) Group 1: A normal or benign (benign) cell nucleus contracting type, (b) Group 2: A normal or benign (benign) cell nucleus dilating type, (c) Group 3: A non-invasive precancerous state such as DCIS (Ductal Carcinoma In Situ) and LCIS (Lobular Carcinoma In Situ) (see http://www.breastcancer. org/), and (d) Group 4: An invasive cancer state composed of IDC (Invasive Ductal Carcinoma) and ILC (Invasive Lobular Carcinoma).

Here, the image classifying unit (image classifying means) 2 previously calculates a feature value $\theta_i$ (i is a feature value type number) of the cell nucleus, such as a duct in the mammary gland pathological image data of low magnification, for each group of the pathology tissue image data pattern. Here, the feature value $\theta_i$ of the cell nucleus is an average value and a variance value of density of mass (number/unit area) per unit area in the cell nucleus, density of a mass area (mass area/unit area), the mass area, a thickness of mass, a length of mass or the like. For example, the average value of the density of the mass area of the cell nucleus may be $\theta_1$, the average value of the mass area may be $\theta_2$, the average value of the thickness of the mass may be $\theta_3$, and the average value of the length of the mass may be $\theta_4$.

Note that there is a trend that the calculated feature value $\theta_i$ is statistically different for each group. Therefore, the image classifying unit 2 previously prepares the low magnification image data belonging to each group, extracts the mass of the cell nucleus from this low magnification image data, and calculates the feature value $\theta_i$ thereof. Then, the image classifying unit 2 defines a score function $s^n(\theta_i)$ of each group, and stores it to the database 3. Here, n is a group number, and in the above example (a) to (d), as the classification is performed into four groups, n=1 to 4. For example, when the feature value $\theta_i$ belongs to the group 3 (n=3), the score function $s^3(\theta_i)$ will be one, and remaining score functions $s^1(\theta_i)$, $s^2(\theta_i)$, and $s^4(\theta_i)$ will be respectively zero.

The image classifying unit 2 generates the image data of low magnification from the high magnification image data acquired by the image data acquisition unit 1, and classifies the generated image data of low magnification into groups by the image data pattern of the plurality of pathological tissue.

Figure 3:
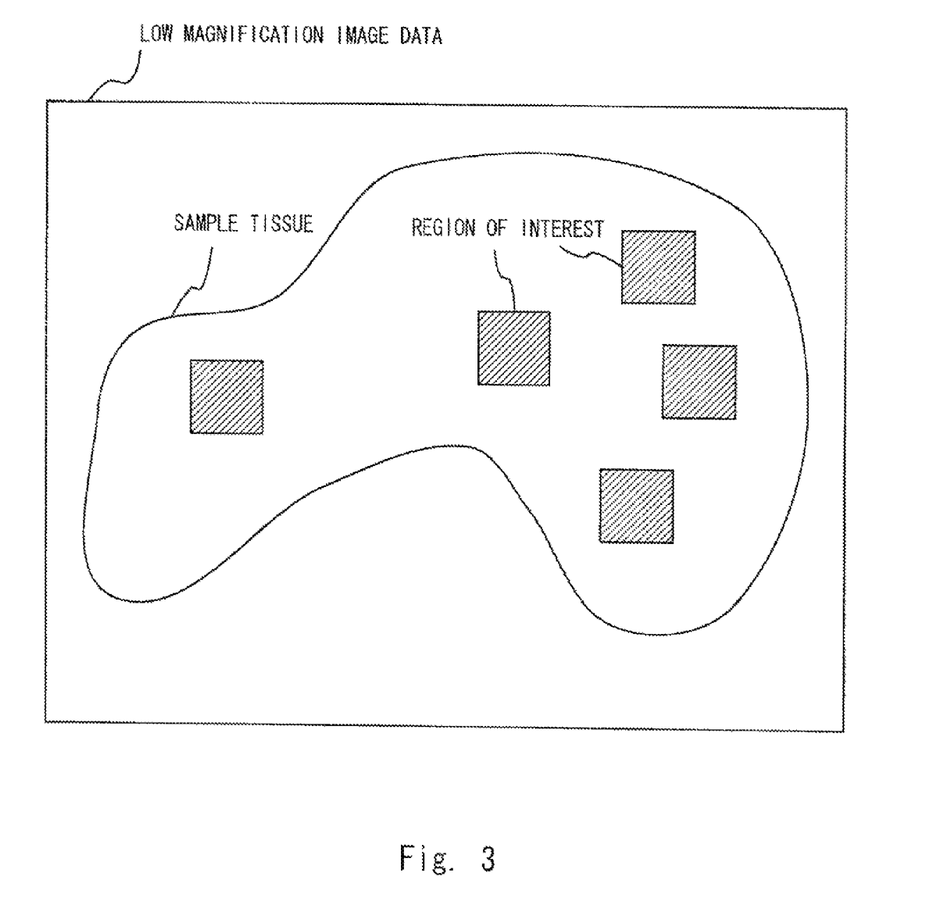
FIG. 3 is a view showing an example of a region of interest extracted from low magnification image data by an image classifying unit.

The image classifying unit 2 firstly generates the image data of low magnification (hereinafter referred to as low magnification image data) from the high magnification image data from the image data acquisition unit 1. Note that the image classifying unit 2 can easily generate the low magnification image data by performing downsampling or the like to the high magnification image data. Further, the image classifying unit 2 extracts the region of interest from the generated low magnification image data (FIG. 3).

Here, the region of interest (ROI: Region of Interest) is a rectangular area in which cell nucleus density is greater or equal to a predetermined value and has high density, however it is not limited to this but it can be set to an arbitrary region to be carefully watched. For example, the region of interest may be a region acquired by dividing the entire sample tissue into a plurality of regions using a predetermined shape such as a rectangular shape of a certain area, where the cell nucleus density ranks higher among the divided plurality of regions. As described so far, when diagnosing the entire sample tissues is not required, it is possible to perform more efficient processes by processing only the extracted region of interest instead of processing the entire sample tissues of low magnification image data.

Figure 4:
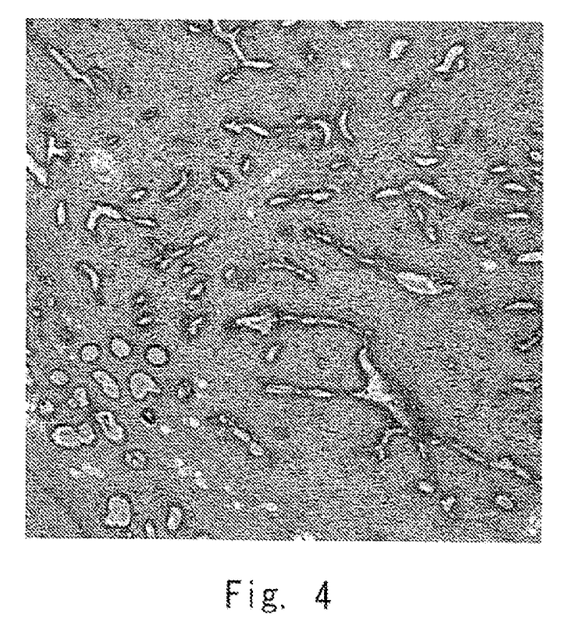
FIG. 4 is a view showing an example of a duct part, which is bluish-purple, has a constant thickness, and is circular or stream region in an HE stained image of low magnification.

Moreover, the image classifying unit 2 extracts, for example, the nuclear aggregation from the generated region of interest of low magnification image data. In this extraction of the nuclear aggregation, the image classifying unit 2 generates monochrome image data based on the stain of the cell nucleus from the low magnification image data. Here, for example, in the case of a Hematoxylin-Eosin (HE) stained image, there is a property in which the part of the cell nucleus is stained in bluish-purple and the part of the cytoplasm is stained in reddish-purple. Accordingly, in the HE stained image of low magnification, a duct part is circular or streak region which is bluish-purple and has a constant thickness (FIG. 4). Moreover, as the HE stained image is double-stained with red and blue, it is composed of colors that will be reddish-purple from bluish-purple via purple, and white, which is unstained color. Therefore, in order to extract a bluish-purple region, it is preferable to use cyanogen, magenta, and above hues that facilitate R identification.

Further, the image classifying unit 2 may use an edge extraction filter for the monochrome image using these generated color elements.

Note that as this edge extraction filter aims to extract the nuclear aggregation instead of the cell nucleus itself, it is preferable to be a filter that convolves a filter that makes blur such as a Gaussian filter, and an edge filter. As such an edge extraction filter, for example, a Gaussian Laplacian filter, a Gabor wavelet filter or the like can be used.

Figure 5:
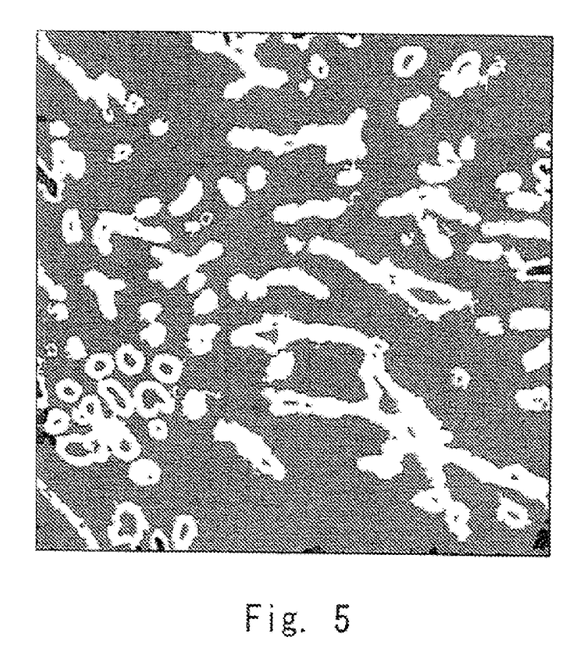
FIG. 5 is a view showing an example of a nuclear aggregation extracted by the image classifying unit from the region of interest of low magnification image data.

The image classifying unit 2 extracts the nuclear aggregation (FIG. 5) from the region of interest of low magnification image data as described above, and calculates the feature value $\theta_i$ for the extracted nuclear aggregation. Moreover, the image classifying unit 2 reads the score function $s^n(\theta_i)$ of each group n from the database 3, and calculates a total $T^n$ of the score functions in each group n using the following formula (1).

$$T^n = \sum_i s^n(\theta_i) \qquad (1)$$

The image classifying unit 2 selects the group n with the maximum total $T^n$ of the score functions as the group n to which the low magnification image data belongs. Further, the image classifying unit 2 associates the high magnification image data, which is to be a base of the low magnification image data, and the region of interest with the selected group n, and stores it to the database 3. As described above, the image classifying unit 2 performs the above classification into groups using the low magnification image data as a preceding step. Then, although classification accuracy is not necessarily high, it is possible to perform the classification of many groups at a high speed, thereby enabling efficient refinement of pathology of the sample tissue. Then, as described later, by the image evaluating unit 5 performing highly accurate pathology evaluation within the refined group, it is possible to perform efficient and highly accurate pathology evaluation as the entire diagnostic imaging support device 10.

The image evaluating unit (image evaluating means) 5 performs highly accurate pathology evaluation whether or not the high magnification image data, which is to be a base of the low magnification image data classified by the image classifying unit 2, is pathological tissue of the classified group. The image evaluating unit 5 firstly reads the high magnification image data, which is to be a base of low magnification image data, and the region of interest from the database 3. Then, the image evaluating unit 5 extracts the region of interest from the high magnification image data according to the read high magnification image data and the region of interest. As described above, the image evaluation unit 5 can easily acquire the high magnification image data and the region of interest from the database 3 without performing special processes, and efficiently perform the pathologic evaluation process described later. Moreover, the image evaluating unit 5 calculates ROI high magnification feature values S31, ..., and S3n for the nuclear aggregation extracted from the region of interest of the high magnification image data.

Here, the high magnification image data includes much information different from the low magnification image data, including that the cell nucleus can be clearly classified. Further, for example, since the feature values, such as a size of the cell nucleus and a degree of circularity, and a major-axis and minor-axis ratio, are important for the pathology evaluation of cancer, these feature values are preferably included in the ROI high magnification feature values S31, ..., and S3n.

The learning database 4 stores high magnification feature values S41, ..., and S4n of the high magnification image data with the pathology evaluation already being performed, and learning parameters S51, ..., and S5n which are used at the time of learning the image evaluation unit 5 described later. Here, the high magnification image data with the pathologic evaluation being already performed (hereinafter referred to as an evaluated image) indicates a high magnification image which has been already evaluated whether it is pathological tissue of each group. On the other hand, the high magnification image not evaluated whether or not it is the pathological tissue of each group shall be referred to as a non-evaluated image.

Note that the ROI high magnification feature values S31, ..., and S3n, and the high magnification feature values S41, ..., and S4n shall be the same kind. Moreover, the above evaluated image requires, for example, two kinds, which are an evaluated image (positive example) belonging to the group n, and an evaluated image (negative example) not belonging to the group n but can easily lead to an erroneous evaluation, and these image data is previously prepared, and stored to the learning database 4. Further, the image evaluating unit 5 can also update the learning parameters S51, ..., S5n using the ROI high magnification feature values S31, ..., and S3n of the evaluated image, and the pathologic evaluation results S61, ..., and S6n thereof.

The image evaluating unit 5 has the machine learning function of the pathology evaluation, and operates in two kinds of modes, which are a setup (learning) mode and an execution (identification) mode. The image evaluating unit 5 executes the machine learning using, for example, an arbitrary learning algorithm such as a neural network and a support vector machine (SVM: Support Vector Machine).

The image evaluating unit 5 executes the machine learning function using the high magnification feature values S41, ..., and S4n of the evaluated image which is stored to the learning database 4 in the setup mode. Then, the image evaluating unit 5 generates the learning parameters S51, ..., and S5n as this machine learning result. Note that in this machine learning, when using the neural network, the weight of the discriminant function is generated as the learning parameters S51, ..., and S5n. On the other hand, when using SVM, a hyperplane coefficient for the identification is generated. Furthermore, the image evaluating unit 5 may execute the above-mentioned machine learning function using the classification result by the image classifying unit 2.

The image evaluating unit 5 stores the generated learning parameters S51, ..., and S5n to the learning database 4. Note that as described above, the image classifying unit 2 classifies the low magnification image into groups efficiently and at a high speed as a preceding step, and performs the refinement. Then, it is possible to reduce the amount of learning process at the time when the image evaluation unit 5 performs the above machine learning using the high magnification image data, and to shorten the processing time thereof.

Moreover, after executing the setup mode, the image evaluating unit 5 executes the execution mode so as to perform the evaluation of the ROI high magnification feature value S31, ..., and S3n of the unevaluated image. When executing the execution mode, the image evaluating unit 5 reads the learning parameters S51, ..., and S5n generated in the setup mode from the learning database 4. Then, the image evaluating unit 5 performs pathologic evaluation for the ROT high magnification feature value S31, ..., and S3n of the unevaluated image using the learning parameter S51, ..., and S5n.

In this pathologic evaluation, the image evaluating unit 5 evaluates with high accuracy whether the unevaluated image, which is the high magnification image data, is a pathological tissue or the group or not (two classifications). As described so far, firstly the image classifying unit 2 classifies the low magnification image data into groups efficiently and at a high speed and perform the refinement as a preceding step, and after that, performs highly accurate pathologic evaluation using the high magnification image data within the group with refined pathology or the like. Then, efficient and highly accurate pathology evaluation can be possible as the entire diagnostic imaging support device 10.

The image evaluating unit 5 outputs the pathology evaluation results S61, ..., and S6n to the output device 6. The output device 6 performs output, such as displaying and printing the pathology evaluation results S61, ..., and S6n. The output device 6 outputs, for example, the normal or benign cell nucleus contracting type (group 1), the normal or benign cell nucleus dilating type (group 2), the non-invasive precancerous state (group 3), the invasive cancer state (group 4), or the like as the pathology evaluation results S61, and S6n. Moreover, display devices such as a liquid crystal display device and a printer device are used for the output device 6.

Note that after the pathology evaluation of the ROI high magnification feature values S31, ..., and S3n of the above unevaluated image, the image evaluating unit 5 may execute the setup mode again, perform additional learning, and reflect the pathology evaluation results S61, ..., and S6n to the learning parameters S51, ..., and S5n. In this case, the image evaluating unit 5 updates the learning parameters S51, ..., and S5n using the ROI high magnification feature values S31, ..., and S3n, and pathology evaluation results S61, ..., and S6n.

Figure 6:
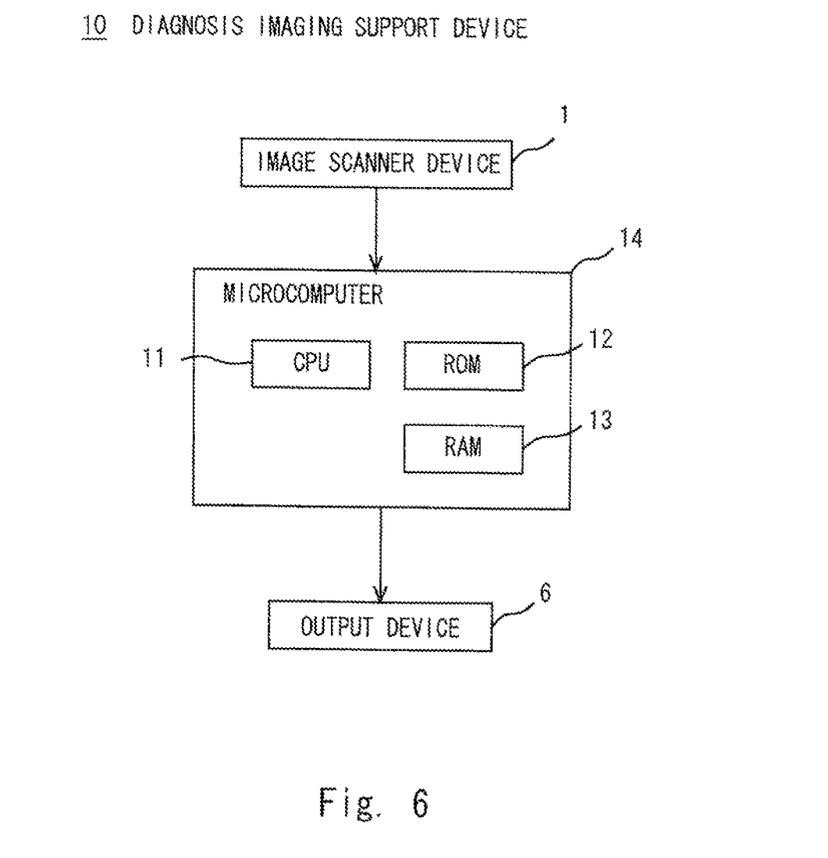
FIG. 6 is a flowchart showing a flow of a diagnostic imaging support method using the diagnostic imaging support device according to the exemplary embodiment of the present invention.

Moreover, the diagnostic imaging support device 10 is configured as hardware with a microcomputer 14 composed of a CPU (Central Processing Unit) 11 performing a control process, a calculation program or the like executed by the CPU 11, a RAM (Random Access Memory) 13 temporarily storing processing data etc. (FIG. 6). Further, the image classifying unit 2 and the image evaluating unit 5 may be realized, for example, by a program that is stored to the ROM 12 and executed by the CPU 11.

Figure 7:
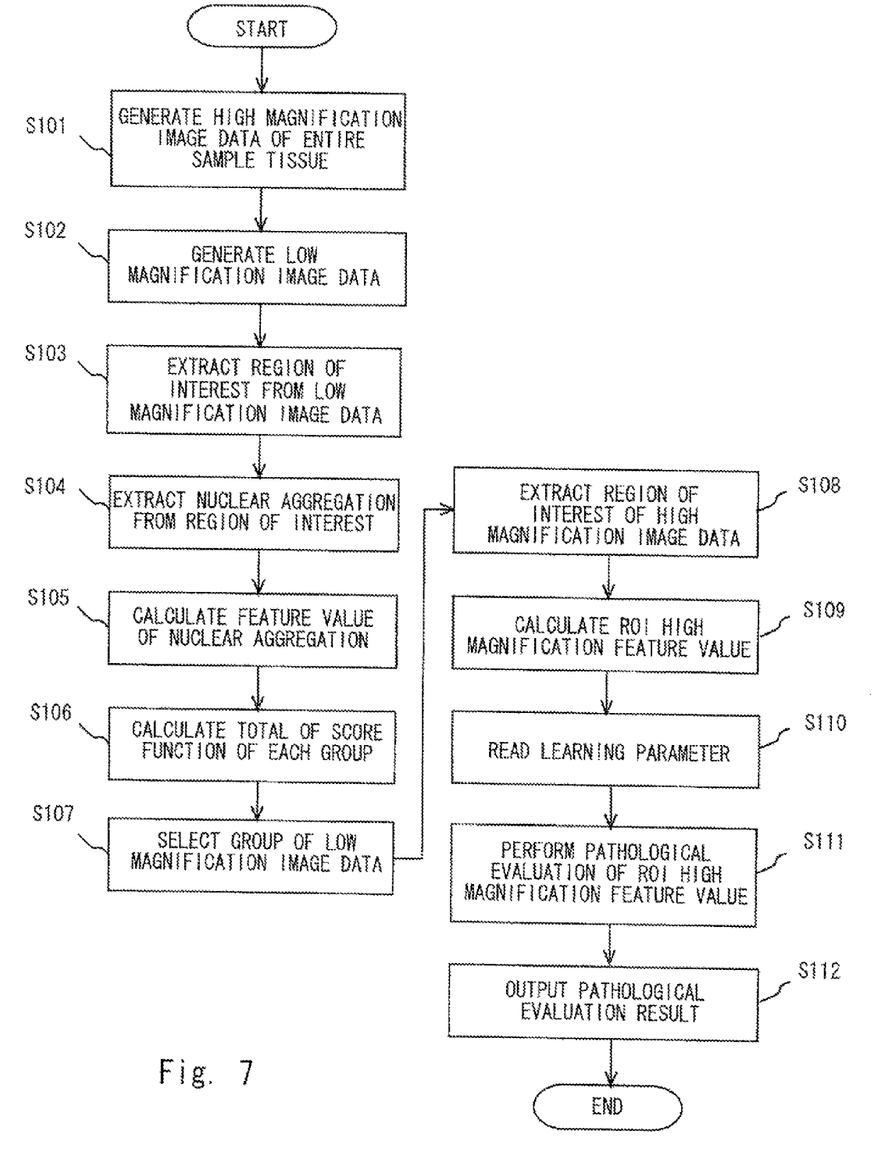
FIG. 7 is a flowchart showing an example of a learning process flow performed by an image evaluating unit of the diagnostic imaging support device according to the exemplary embodiment of the present invention.

Next, a diagnostic imaging support method using the diagnostic imaging support device 10 according to this exemplary embodiment is explained in detail. FIG. 7 is a flowchart showing a flow of the diagnostic imaging support method using the diagnostic imaging support device according to this exemplary embodiment.

The image data acquisition unit 1 takes, for example, a stained mammary gland pathology slide, generates image data of the entire sample tissue (step S101), and outputs it to the image classifying unit 2 and the database 3. Next, the image classifying unit 2 performs downsampling or the like to the high magnification image data from the image data acquisition unit 1, and generates the low magnification image data (step S102). After that, the image classifying unit 2 extracts the region of interest where cell nucleus density becomes greater or equal to a certain value from the generated low magnification image data (step S103).

The image classifying unit 2 extracts the nuclear aggregation from the region of interest of the generated low magnification image data (step S104). Next, the image classifying unit 2 calculates the feature value $\theta_i$ for the nuclear aggregation extracted from the region of interest of low magnification image data (step S105). Moreover, the image classifying unit 2 reads the score function $s^n(\theta_i)$ of each group n from the database 3, and calculates the total $T^n$ of the score functions in each group n using the following formula (1). The image classifying unit 2 selects the group n with the maximum total $T^n$ of the score functions as the group n to which the low magnification image data belongs (step S107). Then, the image classifying unit 2 associates the high magnification image data, which is to be a base of the low magnification image data, and the region of interest with the selected group n, and stores it to the database 3.

The image evaluating unit 5 extracts the region of interest from the high magnification, image data according to the high magnification image data of the n group and the region of interest stored to the database 3 (step S108).

Next, the image classifying unit 2 calculates the ROI high magnification feature values S31, ..., and S3n for the nuclear aggregation extracted from the region of interest of low magnification image data (step S109). The image evaluating unit 5 executes the execution mode, and reads the learning parameters S51, ..., and S5n from the learning database 4 (step S110). Then, the image evaluating unit 5 performs the pathology evaluation to the ROI high magnification feature values S31, ..., and S3n using these learning parameters S51, and S5n (step S111), and outputs the pathology evaluation results from the output device 6 (step S112).

Figure 8:
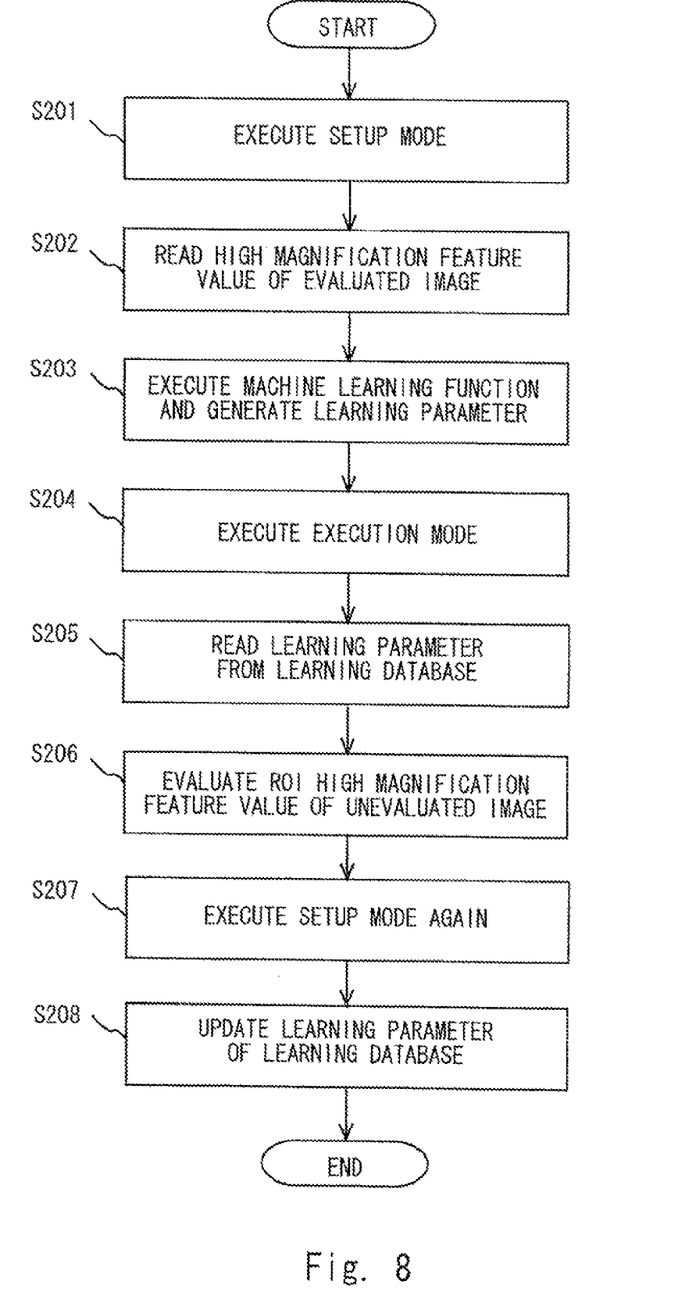
FIG. 8 is a flowchart showing an example of a learning process flow performed by an image evaluating unit of the diagnostic imaging support device according to the exemplary embodiment of the present invention.

Next, the learning processing flow performed by the image evaluation unit 5 of the diagnostic imaging support device according to this exemplary embodiment is described in detail. FIG. 8 is a flowchart showing an example of the learning process flow performed by the image evaluation unit of the diagnostic imaging support device according to this exemplary embodiment.

When executing the setup mode (step S201), the image evaluating unit 5 reads the high magnification feature values S41, ..., and S4n of the evaluated image from the learning database 4 (step S202). Then, the image evaluation unit 5 executes the machine learning function using the read high magnification feature values S41, ..., and S4n, generates the learning parameters S51, ..., and S5n (step S203), and stores the generated learning parameters S51, ..., and S5n to the learning database 4.

After that, the image evaluating unit 5 executes the execution mode (step S204), and reads the learning parameters S51, ..., and S5n generated in the setup mode from the learning database 4 (step S205).

Then, the image evaluating unit 5 performs the pathology evaluation to the ROI high magnification feature values S31, ..., and S3n of the unevaluated image using these learning parameters S51, ..., and S5n (step S206).

Moreover, the image evaluating unit 5 executes the setup mode again (step S207), executes the machine learning function using the ROI high magnification feature values S31, ..., and S3n, and pathology evaluation results S61, ..., and S6n, and updates the learning parameters S51, ..., and S5n of the learning database 4 (step S208). Note that although the execution of the above processes from (step S207) to (step S208) is arbitrary, the above pathology evaluation accuracy further improves by performing these processes.

As mentioned above, in the diagnostic imaging support device 10 according to this exemplary embodiment, the image classifying unit 2 generates the low magnification image data from the high magnification image data acquired by the image data acquisition unit 1, and classifies the generated low magnification image data into groups by the image data pattern of the plurality of pathological tissue. Then, it is possible to classify the low magnification image data into groups efficiently and at a high speed, and perform refinement of the disease condition. Furthermore, the image evaluating unit 5 evaluates with high accuracy whether or not the high magnification image classified and refined by the image classifying unit 5 is pathological tissue of the classified group. Accordingly, an efficient and highly accurate pathology evaluation can be performed.

The present invention is not limited to the above exemplary embodiment, but can be modified as appropriate without departing from the scope.

For example, although in the above exemplary embodiment, the image classifying unit 2 selects the group n to which the low magnification image data belongs using the score function $(\theta_i)$, it is not limited to this, and may select the group n to which the low magnification image data belongs using, for example, the probability function $p''(\theta_i)$ (probability distribution of feature value $\theta_i$).

In this case, for example, when the group n=1 to 4, and the feature value $\theta_i$ belongs to the group 3 (n=3), it is $0 < p''(\theta_i) < 1$, the probability function $p^3(\theta_i)$ will be maximum, and the total will be $1(p^1(\theta_i)+p^2(\theta_i)+p^3(\theta_i)+p^4(\theta_i)=1)$. Note that the value of this probability $p''(\theta_i)$ can be calculated by Bayes' theorem together with the probability to acquire the value $\theta_i$ for different categories when prior probability is assumed. Moreover, the image classifying unit 2 calculates the total $I''$ of $-\log(1.0-p''(\theta_i))$ corresponding to the amount of information of the probability of a complement using the following formula (2). Then, the image classifying unit 2 selects the group n in which the total $I''$ will be the maximum as the group n to which the low magnification, image data belongs. As described above, the probability of the complement is used in order to avoid comparing small values near zero by the probability of an element set, and efficient calculation can be performed.

$$I^n = -\sum_i \log(1.0 - p^n(\theta_i)) \quad (2)$$

Moreover, an arbitrary method can be applied to the classification of the low magnification image data into images, however it is required to perform in a wide range by screening, thus the method described as above with small a amount of calculation is effective, and it is more preferable to execute many classifications at a time.

Note that according to the diagnostic imaging support device 10 of this exemplary embodiment, it is possible to easily perform pathology diagnostic support by executing so-called coarse to fine on a computer. Note that in actual pathology diagnosis, an efficient approach method may differ according to an organ and a stain method except that there is a general approach method such as examining the ratio (NC ratio) of cell nucleus occupying inside a cell. For example, although the Gleason grading is the standard method to evaluate the progress of prostate cancer, and analyzes a size, a shape, and an arrangement of a glandular cavity mainly by an image of the magnification up to about five times. On the other hand, there is Bloom-Richardson grading for mammary gland. This grading evaluates a progress and a grade of cancer from three viewpoints, which are deformation of duct and cell nucleus, and the number of dividing cell nuclei.

Further, a general approach such as examining the ratio (NC ratio) of cell nucleus occupying inside a cell is often effective for the cancer of gastrointestinal tract, such as the stomach and the colon. On the other hand, as for the organs with diversity in the disease condition such as the mammary gland, the disease condition, the progress, and the grade are complexly related. Moreover, the case of the mammary gland is highly diverse, such that there are parts that duct and lobule condition is different, the condition is different in regard to invasion/in situ from duct of cancer cells, and as for the benign tumor, some ducts contract and some ducts dilate or the like. Therefore, it is difficult to perform cancer evaluation only by the general approach such as the NC ratio. Although the conventional Gleason grading and the Bloom-Richardson grading takes duct patterns in low magnification images into consideration, however in the case of classifying an image which is already cancerous, the benign tumor not cancerous, and the precancerous state, which is between cancer and benign tumor, will not be applicable. On the other hand, as described above, the diagnostic imaging support device 10 according to this exemplary embodiment has an advantage that it can perform pathological evaluation to any of the normal, the benign tumor, the precancerous state, and the cancer state.

Additionally, the above exemplary embodiment explained the present invention as the configuration of hardware, however the present invention is not limited to this. The present invention can also be realized by a CPU executing an arbitrary process on a computer. In this case, the computer program can be stored on a storage medium to be provided or provided by transmission via the Internet and other communication media. Further, the storage media include, for example, flexible discs, hard discs, magnetic disks, magneto-optical discs, CD-ROM, DVD, ROM cartridges, RAM memory cartridge with a battery backup, flash memory cartridges, and non-volatile RAM cartridges. Moreover, the communication media include wired communication media such as telephone lines, wireless communication media such as microwave waves or the like.

The present application claims priority rights of and is based on Japanese Patent Application No. 2009-050489 filed on Mar. 4, 2009 in the Japanese Patent Office, the entire contents of which are hereby incorporated by reference.

Industrial Applicability

The present invention can be used to a diagnostic imaging support device, a diagnostic imaging support method, and a storage medium that can perform pathology evaluation of a sample tissue with an image thereof.

| Reference Signs List | |
|---|---|
| 1 | IMAGE DATA ACQUISITION UNIT |
| 2 | IMAGE CLASSIFYING UNIT |
| 3 | DATABASE |
| 4 | LEARNING DATABASE |
| 5 | IMAGE EVALUATION UNIT |
| 6 | OUTPUT DEVICE |
| 10 | DIAGNOSTIC IMAGING SUPPORT DEVICE |

The invention claimed is:

1. A diagnostic imaging support device comprising:
image data acquisition portion that acquires image data of high magnification of sample tissue;
image classifying portion that generates image data of low magnification from the image data of high magnification acquired by the image data acquisition portion, extracts a region of interest from the generated image data of low magnification, calculates a feature value indicating a feature of the region of interest, and classifies the generated image data of low magnification into group by each image data pattern of a plurality of pathological tissue according to the calculated feature value; and image evaluating portion that extracts a region of interest from the image data of high magnification based on the image data of high magnification which is a base of the image data of low magnification classified by the image classifying portion, and the region of interest of the image data of low magnification, calculates a feature value of the region of interest, and evaluates whether or not the image data of high magnification is pathological tissue of the classified group based on the calculated feature value.

2. The diagnostic imaging support device according to claim 1, wherein the image classifying portion calculates a total of a score function for each of the group according to the feature value and the score function, and classifies the image data of low magnification into the group with the largest total of the score function.

3. The diagnostic imaging support device according to claim 1, wherein the image classifying portion classifies the image data of low magnification according to probability distribution of the feature value.

4. The diagnostic imaging support device according to claim 1, wherein the image evaluating portion extracts the region of interest from the image data of high magnification, calculates a feature value indicating a feature of the region of interest, and performs the evaluation according to the calculated feature value.

5. The diagnostic imaging support device according to claim 4, wherein the image evaluating portion includes a learning mode that learns a relationship between the feature value and the evaluation result to set a learning parameter, and an execution mode that performs the evaluation according to the learning parameter.

6. The diagnostic imaging support device according to claim 5, wherein the image evaluating portion executes the learning mode again after executing the execution mode.

7. The diagnostic imaging support device according to claim 5, further comprising a learning database that stores initialization data for the learning by the image evaluating portion, and the learning parameter.

8. The image diagnostic support device according to claim 1, wherein the group by each of the image data pattern of the plurality of pathological tissue includes at least one of a normal, a benign tumor, a precancerous state, and a cancer state.

9. The diagnostic imaging support device according to claim 1, wherein the feature value is an average value or a variation value of at least mass density, density of a mass area, the mass area, a mass thickness, and a mass length per unit area in a cell nucleus.

10. The diagnostic imaging support device according to claim 1, wherein the region of interest is a region in which cell nucleus density is greater than or equal to a predetermined value.

11. A diagnostic imaging support method comprising:

acquiring image data of high magnification of sample tissue;

generating image data of low magnification from the acquired image data of high magnification, extracting a region of interest from the generated image data of low magnification, calculating a feature value indicating a feature of the region of interest, and classifying the generated image data of low magnification into group by each image data pattern of a plurality of sample tissue according to the calculated feature value; and extracting a region of interest from the image data of high magnification based on the image data of high magnification which is a base of the image data of low magnification classified by the image classifying portion, and the region of interest of the image data of low magnification, calculating a feature value of the region of interest, and evaluating whether or not the image data of high magnification is pathological tissue of the classified group based on the calculated feature value.

12. The diagnostic imaging support method according to claim 11, further comprising calculating a total of a score function by each of the group according to the feature value and the score function, and classifying the image data of low magnification into the group with the largest total of the score function.

13. The diagnostic imaging support method according to claim 11, further comprising classifying the image data of low magnification according to probability distribution of the feature value.

14. The diagnostic imaging support method according to claim 11, further comprising extracting the region of interest from the image of high magnification, calculating the feature value indicating the feature of the region of interest, and performing the evaluation according to the calculated feature value.

15. A non-transitory storage medium storing a program causing a computer to execute:

a process that acquires image data of high magnification of sample tissue;

a process that generates image data of low magnification from the acquired image data of high magnification, extracts a region of interest from the generated image data of low magnification, calculates a feature value indicating a feature of the region of interest, and classifies the generated image data of low magnification into a group by each image data pattern of a plurality of pathological tissue according to the calculated feature value; and a process that extracts a region of interested from the image data of high magnification based on the image data of high magnification which is a base of the classified image data of low magnification, and the region of interest of the image data of low magnification, calculates a feature value of the region of interest, and evaluates whether or not the image data of high magnification is pathological tissue of the classified group based on the calculated feature value.

* * * * *